(12) United States Patent
Hirao et al.

(10) Patent No.: US 11,543,618 B2
(45) Date of Patent: Jan. 3, 2023

(54) LENS UNIT

(71) Applicant: SEIKOH GIKEN CO., LTD., Chiba (JP)

(72) Inventors: Tomomi Hirao, Chiba (JP); Ryo Iijima, Chiba (JP)

(73) Assignee: SEIKOH GIKEN CO., LTD., Matsudo (JP)

( * ) Notice: Subject to any disclaimer, the term of this patent is extended or adjusted under 35 U.S.C. 154(b) by 256 days.

(21) Appl. No.: 17/118,829

(22) Filed: Dec. 11, 2020

(65) Prior Publication Data

US 2021/0223500 A1 Jul. 22, 2021

(30) Foreign Application Priority Data

Jan. 21, 2020 (JP) .............................. JP2020-007685

(51) Int. Cl.
*G02B 7/00* (2021.01)
*G02B 7/02* (2021.01)
*G02B 13/18* (2006.01)
*G02B 5/00* (2006.01)
*G02B 1/04* (2006.01)
G02B 3/02 (2006.01)
G02B 3/04 (2006.01)

(52) U.S. Cl.
CPC ............. *G02B 7/028* (2013.01); *G02B 1/041* (2013.01); *G02B 5/005* (2013.01); *G02B 13/18* (2013.01); G02B 3/02 (2013.01); G02B 3/04 (2013.01); G02B 7/00 (2013.01); G02B 7/003 (2013.01); G02B 7/008 (2013.01); G02B 7/02 (2013.01); G02B 7/022 (2013.01); G02B 7/025 (2013.01)

(58) Field of Classification Search
CPC .......... G02B 7/28; G02B 7/022; G02B 1/041; G02B 5/005; G02B 13/18; G02B 7/00; G02B 7/003; G02B 7/008; G02B 7/025; G02B 3/02; G02B 3/04
USPC ........ 359/708, 718, 738, 739, 811, 819, 820
See application file for complete search history.

(56) References Cited

U.S. PATENT DOCUMENTS 3,749,479 A * 7/1973 Kempf .................. G02B 7/021
 359/819
4,488,776 A * 12/1984 Skinner .................. G02B 7/022
 359/819

(Continued)

FOREIGN PATENT DOCUMENTS

EP WO 2011089815 A1 * 7/2011 ............. G02B 7/021
EP WO 2019003879 A1 * 1/2019 ............. G02B 13/18

(Continued)

*Primary Examiner* — Evelyn A Lester
(74) *Attorney, Agent, or Firm* — United IP Counselors, LLC

(57) ABSTRACT

It is provided a lens unit to be small-sized, while reducing deterioration in optical performance after experiencing thermal expansion. The lens unit includes an aperture member, a lens, an image sensor, and a holder. A range where the aperture member abuts on a flange part of the lens overlaps with a range where the holder abuts on the flange part of the lens. A first gap is provided between a holder inclined surface of the holder and a lens inclined surface of the lens over the entire circumference. A second gap is provided between an outer circumferential surface of the lens and an inner surface of the holder over the entire circumference.

20 Claims, 9 Drawing Sheets

SECTION A - A

(56) References Cited

U.S. PATENT DOCUMENTS

| | | | | |
|---|---|---|---|---|
| 4,737,017 A * | 4/1988 | Nagasaka | | G02B 7/026 359/811 |
| 7,221,524 B2 * | 5/2007 | Ye | | H01L 27/14632 359/822 |
| 7,230,777 B2 * | 6/2007 | Ye | | G02B 9/16 359/701 |
| 7,738,195 B2 * | 6/2010 | Mashima | | G03B 3/10 359/821 |
| 7,755,857 B2 * | 7/2010 | Yu | | G02B 13/003 359/811 |
| 7,830,623 B2 * | 11/2010 | Hara | | G02B 7/021 359/811 |
| 7,969,667 B2 * | 6/2011 | Sodeyama | | G02B 7/021 359/740 |
| 8,355,216 B2 * | 1/2013 | Orihara | | H01L 31/02325 359/811 |
| 8,537,477 B2 * | 9/2013 | Shioda | | G02B 7/102 359/701 |
| 8,848,501 B2 * | 9/2014 | Tanaka | | G02B 7/025 359/819 |
| 8,866,949 B2 * | 10/2014 | Yano | | G02B 27/0018 348/335 |
| 9,726,846 B2 * | 8/2017 | Bone | | G02B 7/026 |
| 11,314,101 B2 * | 4/2022 | Chan | | G02B 7/02 |
| 11,347,017 B2 * | 5/2022 | Komiyama | | B29D 11/00403 |
| 11,474,305 B2 * | 10/2022 | Yamada | | B24B 47/12 |
| 2002/0012178 A1 * | 1/2002 | Noguchi | | G02B 7/102 359/813 |
| 2005/0168846 A1 * | 8/2005 | Ye | | H04N 5/2253 359/819 |
| 2006/0221469 A1 * | 10/2006 | Ye | | G02B 7/021 359/811 |
| 2009/0086342 A1 | 4/2009 | Seki | | |
| 2009/0122427 A1 * | 5/2009 | Nomura | | G02B 7/023 359/819 |
| 2009/0174954 A1 * | 7/2009 | Hara | | G02B 7/021 359/819 |
| 2009/0185032 A1 * | 7/2009 | Sakai | | F03G 7/065 359/813 |
| 2009/0279191 A1 * | 11/2009 | Yu | | G02B 7/022 359/819 |
| 2010/0027135 A1 * | 2/2010 | Sodeyama | | G02B 7/021 359/740 |
| 2010/0073534 A1 * | 3/2010 | Yano | | H01L 27/14625 359/503 |
| 2011/0050978 A1 * | 3/2011 | Yano | | G02B 27/0018 359/601 |
| 2011/0267710 A1 * | 11/2011 | Shioda | | G03B 11/043 359/817 |
| 2014/0218813 A1 * | 8/2014 | Araki | | G02B 7/021 359/819 |
| 2015/0271372 A1 * | 9/2015 | Sekimoto | | G02B 7/08 348/335 |
| 2015/0323757 A1 * | 11/2015 | Bone | | B29D 11/00432 359/819 |
| 2018/0081143 A1 * | 3/2018 | Shimono | | G02B 7/025 |
| 2020/0178765 A1 * | 6/2020 | Sato | | A61B 1/00186 |
| 2022/0146777 A1 * | 5/2022 | Inaba | | H04N 5/225 |

FOREIGN PATENT DOCUMENTS

| | | | | |
|---|---|---|---|---|
| EP | WO 2019112119 A1 * | 6/2019 | | G02B 7/02 |
| JP | 2005018024 A * | 1/2005 | | G02B 7/04 |
| JP | 2008-064942 A | 3/2008 | | |

* cited by examiner

SECTION A – A

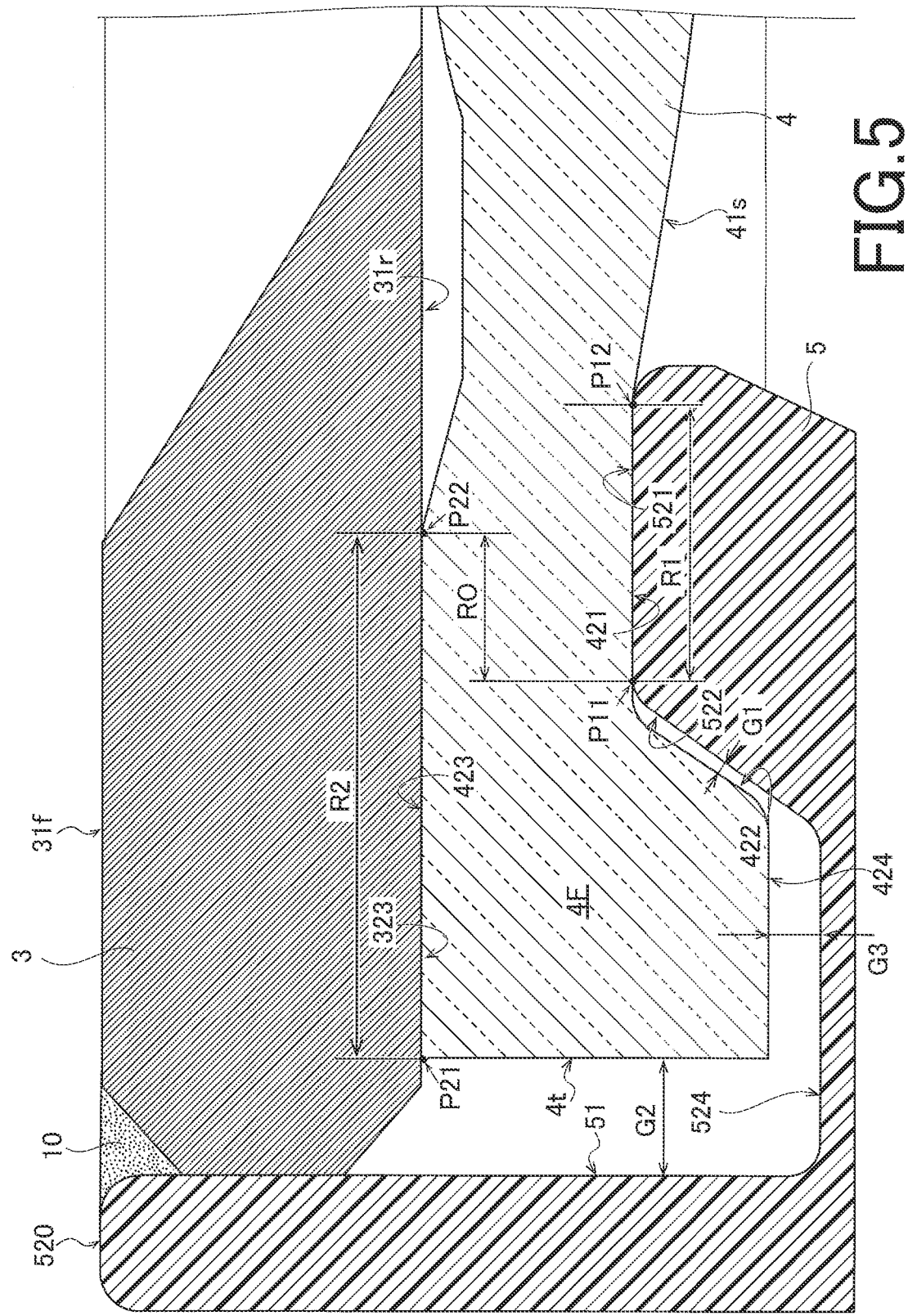

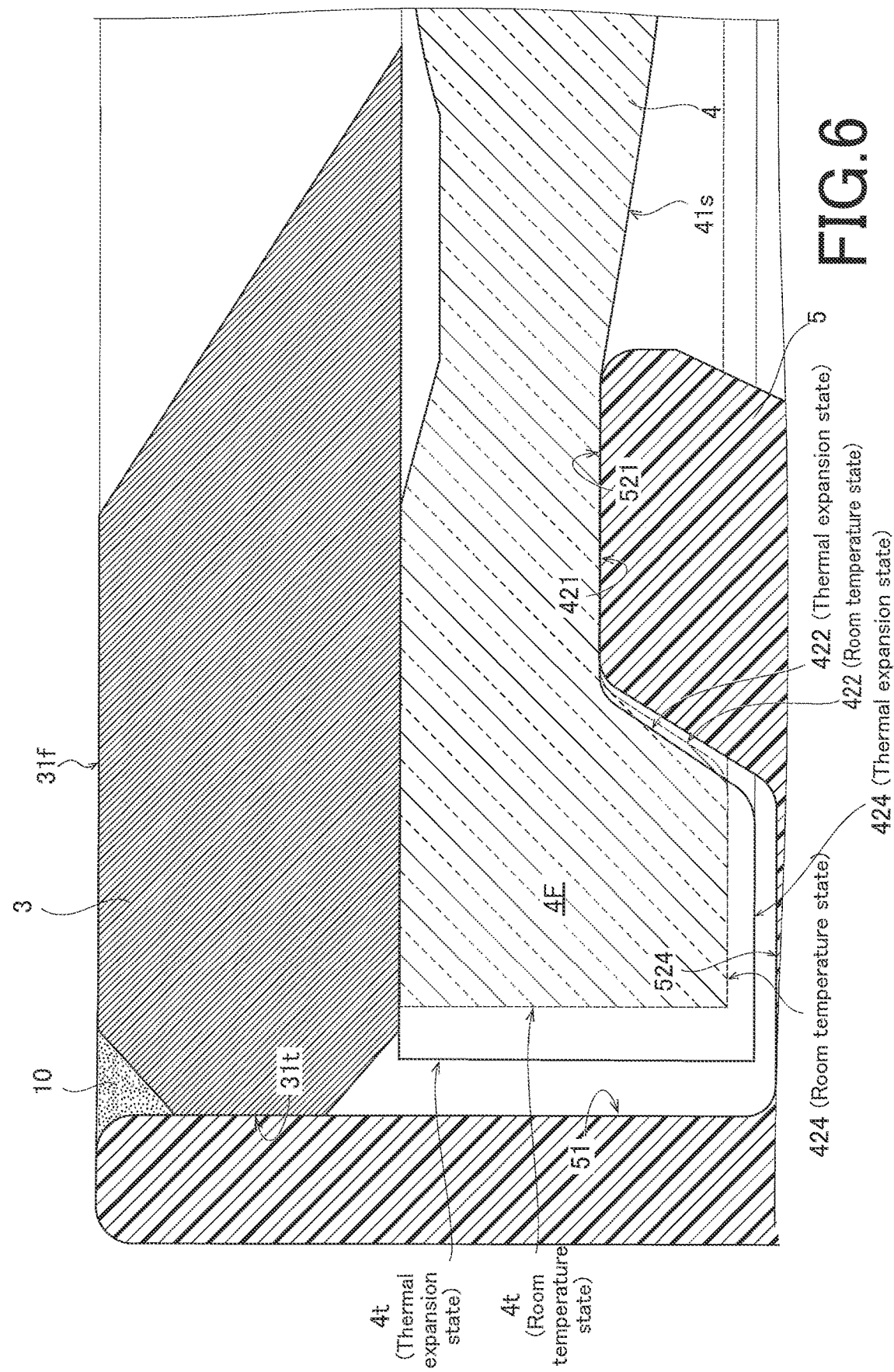

LENS UNIT

CROSS-REFERENCE TO RELATED APPLICATIONS

This application claims the benefit of priority to Japanese Patent Application No. 2020-007685, filed on Jan. 21, 2020, the entire contents of which are hereby incorporated by reference.

BACKGROUND

1. Technical Field

The present invention relates to a lens unit. Particularly, the present invention relates to a lens unit in which an optical component is housed in a holder.

2. Description of the Background

What is conventionally known is a small lens unit which is mounted on a relatively small electronic device such as, for example, a smartphone, a mobile phone, or a tablet terminal. The lens unit is disposed on a circuit board of the electronic device for efficient mounting (for example, see Japanese Laid-open Patent Application Publication No. 2008-64942).

An imaging device (a lens unit) disclosed in the Japanese Laid-open Patent Application Publication No. 2008-64942 includes: a lens frame including a projecting part projecting toward an image-forming plane side of an imaging lens; and a barrel provided with a female screw on its inner circumferential surface to be screwed onto a male screw of the lens frame. The lens frame is shifted straight in the optical axis direction via the male screw and the female screw, to adjust the focus of the imaging lens.

BRIEF SUMMARY

Incidentally, in order for a lens unit to be disposed on a circuit board, the lens unit and other electronic components to be disposed on the circuit board must undergo a reflow soldering process. In the reflow soldering process, the lens unit is exposed to a high temperature environment of, for example, 270° C. Accordingly, in order to mount the lens unit on an electronic device of a smaller size, it is not only required that the lens unit itself be reduced in size, it is also required that changes in optical performance be as small as possible due to thermal expansion of each part of the lens unit in the reflow soldering process.

Here, as in the conventional lens unit described above, when focus adjustment is carried out with screws before the reflow soldering process, a proper focus adjustment set may be lost. That is, the position in the optical axis direction of the imaging lens may change, for example, due to the screws tilting relative to the optical axis under a high temperature environment. Once the position of the optical axis direction has changed, the shape of each part of the lens unit is not recovered when returned to a room temperature environment. Thus, the optical performance may be deteriorated after the reflow soldering process. Furthermore, a screw-based focus adjusting mechanism barely attains finer threading when the lens unit is to be further reduced in size. Additionally, since the screw-based focus adjusting mechanism is provided on the outer side, the lens unit is hardly reduced in size.

In view of the foregoing, an object of the present invention is to provide a lens unit of small size, while reducing deterioration in optical performance after thermal expansion compared to optical performance before the thermal expansion. In other words, an object of the present invention is to provide a lens unit of small size, while reducing deterioration in optical performance after experiencing thermal expansion.

An aspect of the present invention is to provide a lens unit including: an image sensor; a lens formed of curable resin; an aperture member formed of an elastic body; and a holder having a hollow structure. In the holder, the aperture member and the lens are disposed in sequence from a first end on one side along an optical axis, and the image sensor is disposed at a second end on other side along the optical axis. The lens includes a curved surface part formed at its center and a flange part formed on an outer side of the curved surface part. The flange part includes: a first flat surface orthogonal to the optical axis and formed on the image sensor side, a second flat surface orthogonal to the optical axis and formed on the aperture member side, and a lens inclined surface formed on an outer side than the first flat surface and inclined from the first flat surface toward the image sensor. The holder includes a first abutting surface abutting on the first flat surface of the lens and a holder inclined surface formed on an outer side than the first abutting surface and inclined from the first abutting surface toward the image sensor. The aperture member includes a second abutting surface abutting on the second flat surface of the lens. A range of the second abutting surface includes an overlapping range that overlaps with a range of the first abutting surface as seen from an optical axis direction. A distance from the first flat surface of the lens to a focal plane of the lens and a distance from the first abutting surface of the holder to an image-forming plane of the image sensor are equal to each other. A first gap is provided between the holder inclined surface and the lens inclined surface over an entire circumference. A second gap is provided between an outer circumferential surface of the lens and an inner surface of the holder over an entire circumference.

An embodiment of the present invention allows a lens unit to be small-sized, while reducing deterioration in optical performance after experiencing thermal expansion.

BRIEF DESCRIPTION OF DRAWINGS

The present invention will be explained in greater detail below on the basis of embodiments with reference to the accompanied drawings.

FIG. 5 is an enlarged cross-sectional view of the structure around the flange part of the lens in the lens unit according to the first embodiment.

FIG. 6 is an explanatory illustration of the difference in shape of the parts between a room temperature state and a thermal expansion state in FIG. 5.

DETAILED DESCRIPTION

In the following, with reference to FIGS. 1 to 7, a lens unit 1 according to a first embodiment will be described.

Figure 1:
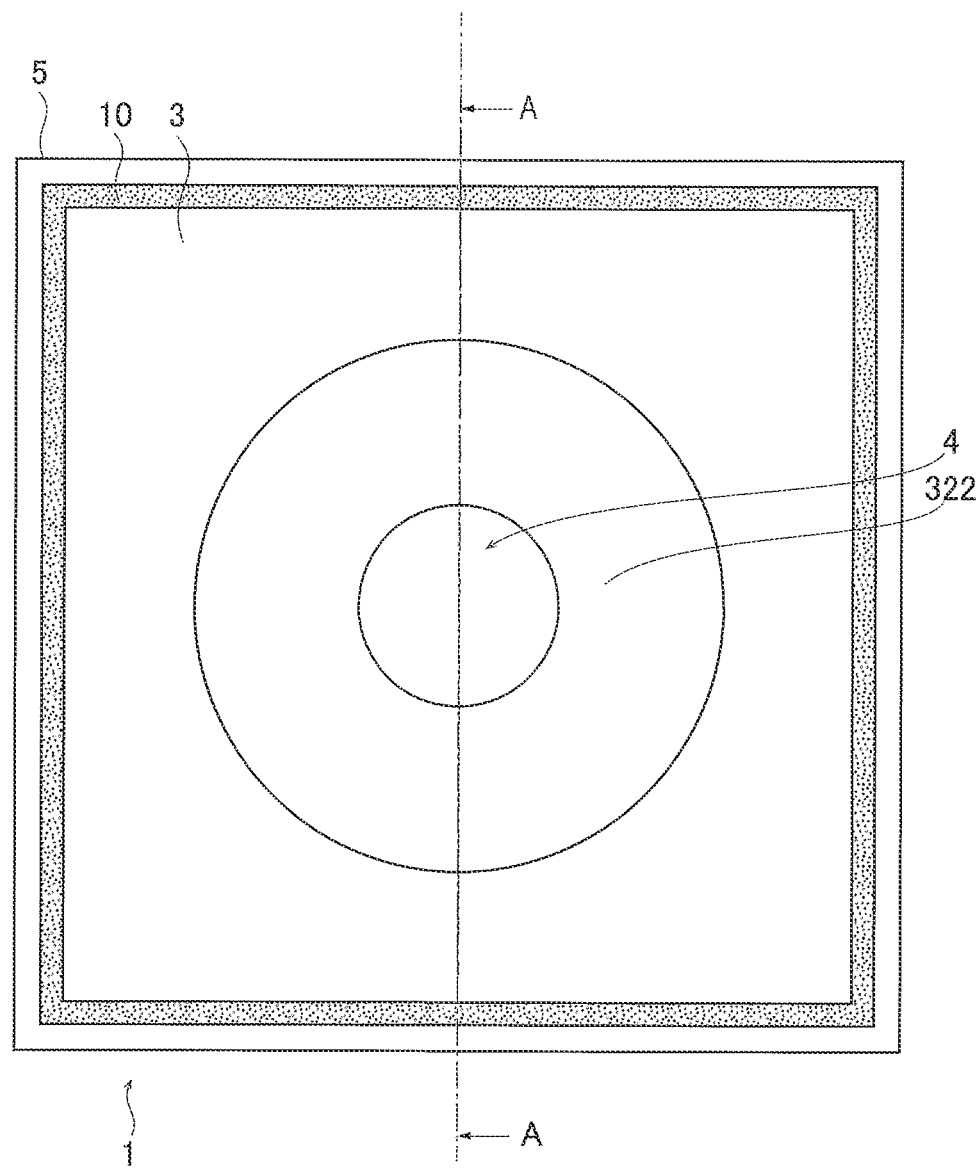
FIG. 1 is a plan view of a lens unit according to a first embodiment.

The lens unit 1 according to the present embodiment is a lens unit of an extremely small size and, for example, has a cuboid shape as a whole. FIG. 1 is a plan view as seen from the object side (that is, the light incident side) on an optical axis Ax of the lens unit 1.

The exterior shape of the lens unit 1 as seen from the object side is substantially square. Each side of the square measures 10 mm or less and typically falls within a range of about 1 mm to 6 mm. The height of the lens unit 1 (that is, the length in the longitudinal direction in FIG. 2) is, for example, 5 mm or less.

Figure 2:
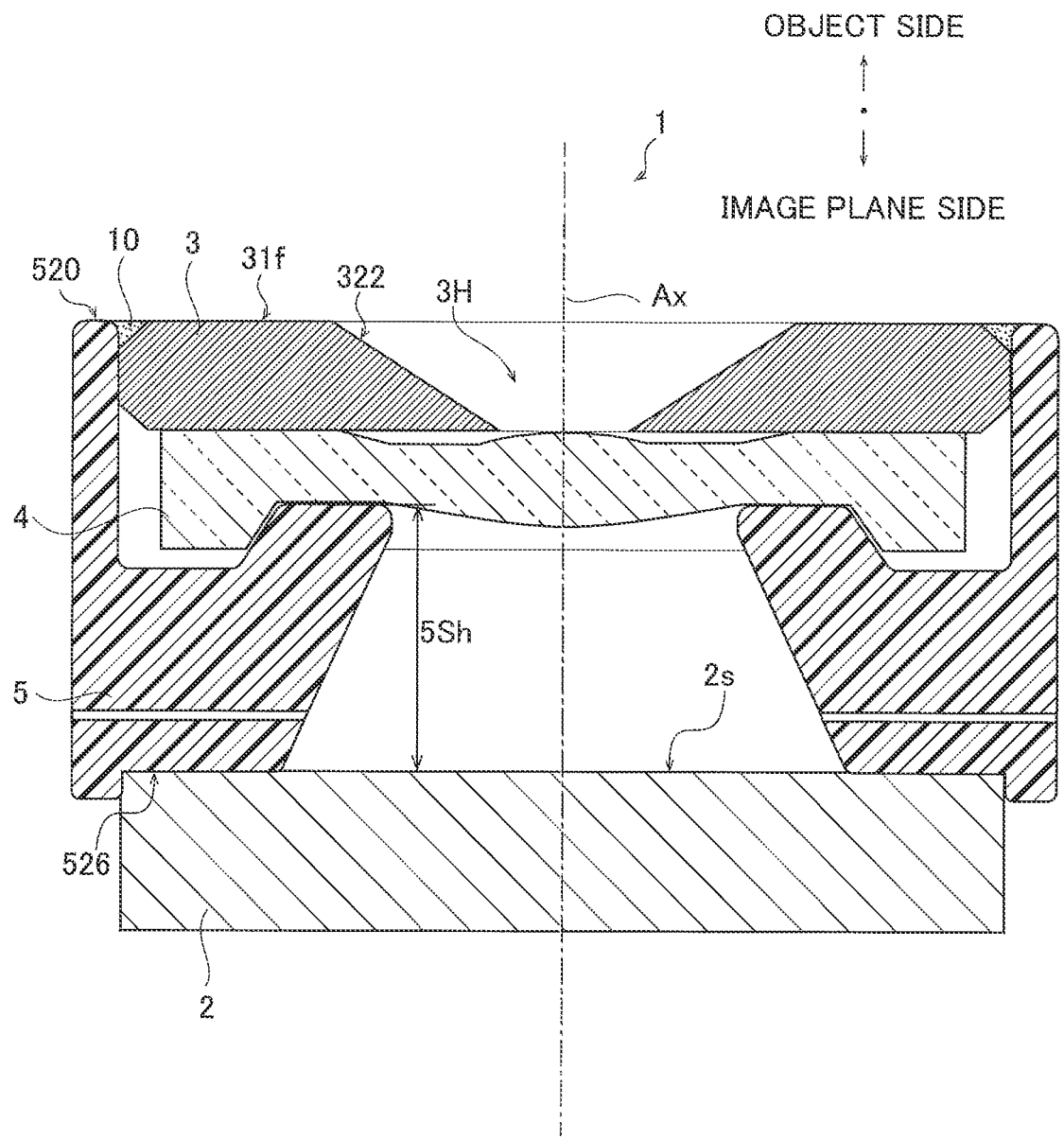
FIG. 2 is a cross-sectional view taken along line A-A in FIG. 1.

FIG. 2 is a cross-sectional view of the lens unit 1 taken along a plane including the optical axis Ax (a cross-sectional view taken along line A-A in FIG. 1). In FIG. 2, a side on which the optical axis Ax is oriented toward an object in using the lens unit 1 is indicated by "OBJECT SIDE", and a side opposite to the object side is indicated by "IMAGE PLANE SIDE". The indication is just for the sake of convenience, and does not limit by any means the structure of the lens unit 1 according to the present embodiment.

In the following, a direction along the optical axis Ax may be referred to as "the optical axis direction" and a direction along a plane orthogonal to the optical axis Ax (for example, the lateral direction in FIG. 2) may be referred to as "the lateral direction." In a cross-sectional view taken along a plane including the optical axis Ax, a side nearer to the optical axis Ax may be referred to as "the inner side", while a side farther from the optical axis Ax may be referred to as "the outer side."

As illustrated in FIG. 2, the lens unit 1 includes an image sensor 2 (namely, an imaging element) at an end on the image plane side. The image sensor 2 may be a solid-state imaging element such as CMOS, CCD or the like.

In order for the lens unit 1 according to the present embodiment to be efficiently mounted on a small electronic device, the lens unit 1 is disposed on a circuit board (not shown) of the electronic device together with other electronic components. More specifically, an end on the image sensor 2 side of the lens unit 1 is disposed to face the substrate surface of the circuit board. Through a reflow soldering process, the lens unit 1 is fixed onto the circuit board.

In the reflow soldering process, in order to melt solder on the circuit board in a reflow oven, the lens unit 1 is exposed to a high temperature of, for example, about 270° C. Assuming that great distortion has occurred under the high temperature environment due to difference of the parts of the lens unit 1 in thermal expansion, the distortion will remain despite the temperature recovering room temperature after the reflow soldering process. This distortion influences the optical performance. For example, even if an optical performance has been achieved before the reflow soldering process, that optical performance may not be achieved after the reflow soldering process.

In view of the foregoing, the lens unit 1 according to the present embodiment is designed to achieve the following objectives.

(i) The lens unit immediately after manufactured is arranged so that the focal plane of the lens matches with the image-forming plane of the image sensor, thereby eliminating focus adjustment mechanism and allowing the lens unit to be compact. (ii) Even in the case where thermal expansion occurs due to a high temperature environment such as the reflow soldering process, any distortion in each part of the lens unit 1 is prevented so that the optical performance (that is, the focal plane of the lens matches the image-forming plane of the image sensor) of the lens unit after the thermal expansion will not be substantially changed from that of lens unit before the thermal expansion.

In the following, a specific structure of the lens unit 1 according to the present embodiment will be described for achieving the objectives (i), (ii).

As illustrated in FIG. 2, the lens unit 1 according to the present embodiment includes: an image sensor 2; a lens 4 formed of curable resin, an aperture member 3 formed of an elastic body; and a holder 5 having a hollow structure.

The holder 5 houses the aperture member 3 and the lens 4 while disposing the lens 4 at a predetermined position relative to the image sensor 2 so as to achieve desired optical performance. In the holder 5, the aperture member 3 and the lens 4 are disposed in sequence from an object side end 520 (namely, an example of a first end) along an optical axis Ax, and the image sensor 2 is disposed at an image plane side end 526 (namely, an example of a second end).

Figure 3:
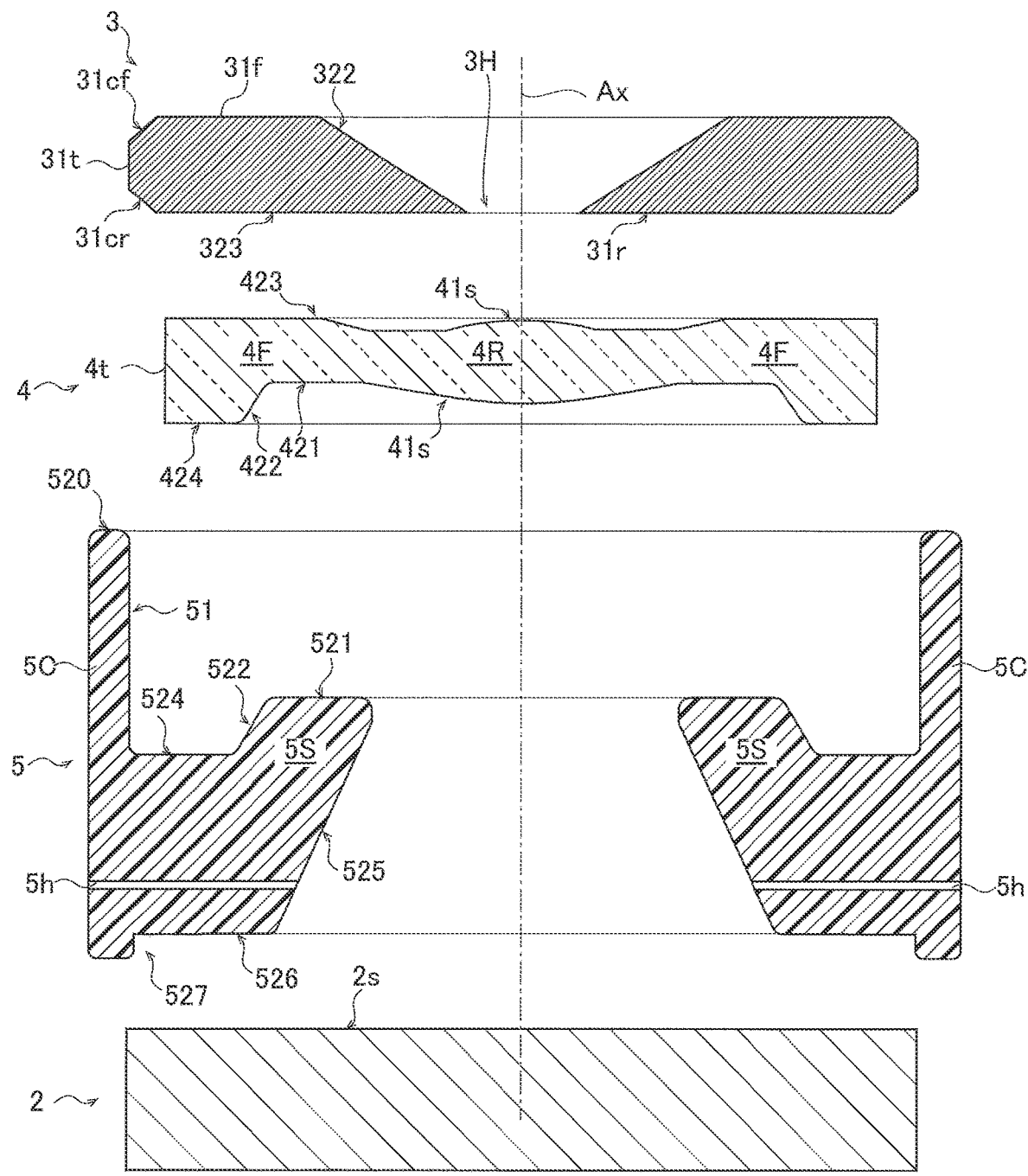
FIG. 3 is an exploded cross-sectional view of a lens unit according to the first embodiment.

As illustrated in FIG. 2, the aperture member 3 is provided with a tapered surface 322 which is tapered so that the diameter of the region of a circular opening 3H becomes smaller toward the lens 4 as seen from the object side along the optical axis Ax (that is, from an object side main surface 31$f$ toward an image plane side main surface 31$r$ in FIG. 3). The opening 3H of the aperture member 3 defined by the tapered surface 322 functions as an aperture that regulates the range of incident light on the lens 4 from the object side.

The aperture member 3 is a thin plate-like elastic body and integrally formed using, for example, heat-resistant resin such as liquid crystal polymer, polyphenylene sulfide (PPS) or the like. The aperture member 3 may be, for example, metal such as aluminum.

As illustrated in FIG. 3, a sidewall surface 31$t$ is formed at the outer edge of the aperture member 3. A chamfered surface 31$cf$ is formed between the object side main surface 31$f$ and the sidewall surface 31$t$. A chamfered surface 31$cr$ is formed between the image plane side main surface 31$r$ and the sidewall surface 31$t$. The sidewall surface 31$t$ is slightly greater in size than an inner surface 51 of the holder 5, which will be described later. The aperture member 3 is press-fitted into the holder 5 so that the sidewall surface 31$t$ is brought into contact with the inner surface 51 of the holder 5, and thus, the aperture member 3 is held in a housing part 5C of the holder 5.

A part of the image plane side main surface 31$r$ of the aperture member 3 is a second abutting surface 323 that abuts on a second flat surface 423 of the lens 4, which will be described later.

As illustrated in FIGS. 2 and 3, space between the chamfered surface 31$cf$ of the aperture member 3 and the inner surface 51 of the holder 5 is filled with an adhesive agent 10, so as to enhance the coupling between the aperture member 3 and the holder 5. That is, the aperture member 3 itself is small and cannot allow for a great margin for press-fitting between the sidewall surface 31$t$ and the inner surface 51 of the holder 5. Therefore, in order to prevent the aperture member 3 from coming off from the holder 5 under thermal expansion environment, the adhesive agent 10 is used for reinforcement. Material of the adhesive agent 10 may be, but not limited to, thermosetting resin or an ultraviolet curing resin, for example. As illustrated in FIG. 1, the adhesive agent 10 is disposed at the circumferential edge on the outer side of the aperture member 3.

In the example in FIG. 2, while the object side main surface 31f of the aperture member 3 and the object side end 520 of the holder 5 are on an identical plane, the present invention is not limited thereto. The object side main surface 31f of the aperture member 3 may project toward the object side from the object side end 520 of the holder 5. Conversely, the object side main surface 31f of the aperture member 3 may be retracted toward the image plane side.

As illustrated in FIG. 3, the lens 4 includes: a curved surface part 4R formed at the center; and a flange part 4F formed on the outer side of the curved surface part 4R. The curved surface part 4R has a curved surface 41s and a function of forming an image of an object on an image-forming plane 2s of the image sensor 2. The lens 4 according to the present embodiment is circular as seen in a plan view, and its object side is a convex lens. The flange part 4F is provided for positioning the lens 4 inside the holder 5.

While the curved surface part 4R may be a spherical lens or an aspheric lens, the aspheric lens is advantageous in reducing aberration. Since the lens 4 is a resin lens which has small restriction in forming a shape thereof, the lens 4 can be easily fabricated even if it is an aspheric lens.

The lens 4 is integrally formed using heat-resistant thermosetting resin such as, for example, silicone-based or epoxy-based resin. Here, the present invention is not limited thereto. In addition to thermosetting resin, any material such as ultraviolet curing resin can be used for the lens 4 so long as it is curable resin that cures upon application of energy.

As illustrated in FIG. 3, the flange part 4F includes, on the image plane side in sequence from the curved surface 41s toward the outer side, a first flat surface 421, a lens inclined surface 422, and an image plane side end surface 424.

The first flat surface 421 is orthogonal to the optical axis Ax and formed on the image sensor 2 side, and abuts on a first abutting surface 521 of the holder 5, which will be described later. The first flat surface 421 abuts on the first abutting surface 521 of the holder 5, and thus, the focal plane of the lens 4 is defined.

The lens inclined surface 422 is formed on the outer side than the first flat surface 421, and is inclined from the first flat surface 421 to the image plane side end surface 424 toward the image sensor 2.

The image plane side end surface 424 is formed on the outer side than the lens inclined surface 422. In FIG. 3, while the image plane side end surface 424 is a flat surface orthogonal to the optical axis Ax, the present invention is not limited thereto. As will be described later, the image plane side end surface 424 may be preferably formed so as to provide a gap, when the lens unit 1 is assembled, between the image plane side end surface 424 and a flange part housing bottom surface 524 (which will be described later) of the holder 5. Thus, the image plane side end surface 424 may not be a flat surface.

The flange part 4F includes the second flat surface 423 that extends on the object side from the curved surface 41s toward the outer side. That is, the second flat surface 423 is orthogonal to the optical axis Ax and formed on the aperture member 3 side. The second flat surface 423 abuts on the second abutting surface 323 in the image plane side main surface 31r of the aperture member 3. In other words, in the image plane side main surface 31r of the aperture member 3, the surface that abuts on the second flat surface 423 of the flange part 4F is the second abutting surface 323.

The second flat surface 423 is provided to abut on the second abutting surface 323 of the aperture member 3, so that the flange part 4F is supported in the optical axis direction.

As illustrated in FIGS. 2 and 3, the holder 5 has a hollow structure. The holder 5 houses the aperture member 3 and the lens 4 and retains them at a predetermined position. The image sensor 2 is attached to the image plane side end 526 of the holder 5 with the adhesive agent 10. The adhesive agent for attaching the image sensor 2 to the holder 5 may be, but not limited to, thermosetting resin material or ultraviolet curing resin material, for example. Preferably, adhesive agent of high viscosity may be applied to the adhesive agent for attaching the image sensor 2 to the holder 5, thereby preventing entry of the adhesive agent to the image-forming plane 2s of the image sensor 2.

The holder 5 is integrally formed using heat-resistant resin such as liquid crystal polymer, polyphenylene sulfide (PPS) or the like.

As illustrated in FIG. 3, the holder 5 includes a housing part 5C disposed on the object side and a lens supporting part 5S disposed on the image plane side.

The cross-sectional shape of the housing part 5C taken along a plane orthogonal to the optical axis Ax has periphery of substantially a square. The housing part 5C has space enough to house the aperture member 3 and the lens 4. When the aperture member 3 is housed in the housing part 5C, as described above, the aperture member 3 is press-fitted into the inner surface 51 of the housing part 5C; and the chamfered surface 31cf of the aperture member 3 and the inner surface 51 of the housing part 5C are fixed to each other with the adhesive agent 10.

As will be described later, in order to avoid contact between the lens 4 and the holder 5 under a high-temperature environment due to the difference in thermal expansion amount, a gap (a gap G2 which will be described later) is secured between the sidewall surface 4t of the lens 4 and the inner surface 51 of the housing part 5C.

As illustrated in FIG. 3, the lens supporting part 5S of the holder 5 includes the first abutting surface 521 and a first holder inclined surface 522. The first abutting surface 521 abuts on the first flat surface 421 of the lens 4. The first holder inclined surface 522 is formed on the outer side than the first abutting surface 521, and inclined from the first abutting surface 521, toward the image sensor 2, to the flange part housing bottom surface 524.

At the inner circumferential surface of the lens supporting part 5S of the holder 5, a second holder inclined surface 525 is formed. The second holder inclined surface 525 is inwardly inclined toward the object side in the optical axis direction.

The holder 5 is provided with through holes 5h (at two locations) for evacuating gas between the lens 4 and the image sensor 2. In FIG. 2, assuming that the space inside the holder 5 surrounded by the lens 4 and the image sensor 2 was sealed, the inside gas might expand under a high temperature environment and adversely affect the lens 4 and/or the image sensor 2.

As illustrated in FIG. 3, the through holes 5h penetrate through the second holder inclined surface 525 and the outer surface of the holder 5. The position of the through holes 5h is not limited to the position indicated in FIG. 3. Alternatively, the through holes may be formed by cutting out part of the image plane side end 526, for example.

Figure 4A:
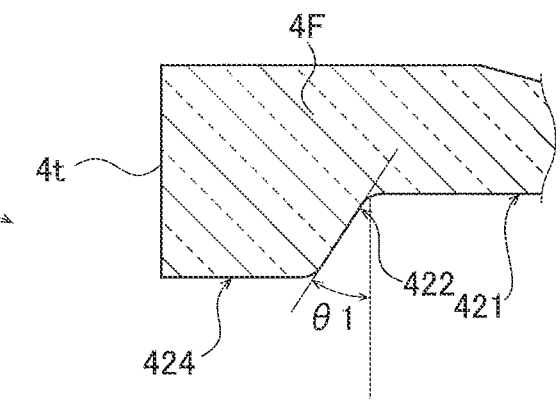
FIGS. 4A to 4C are cross-sectional views illustrating the engagement relationship between a flange part of a lens and a holder in the lens unit according to the first embodiment.
Figure 4B:
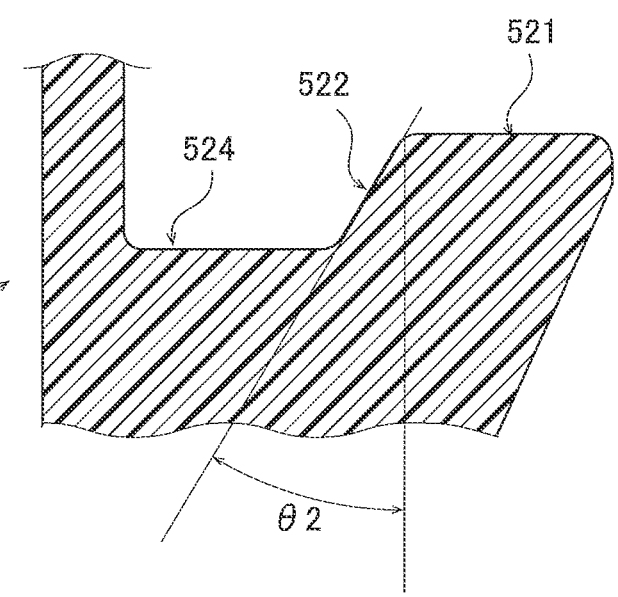
Figure 4C:
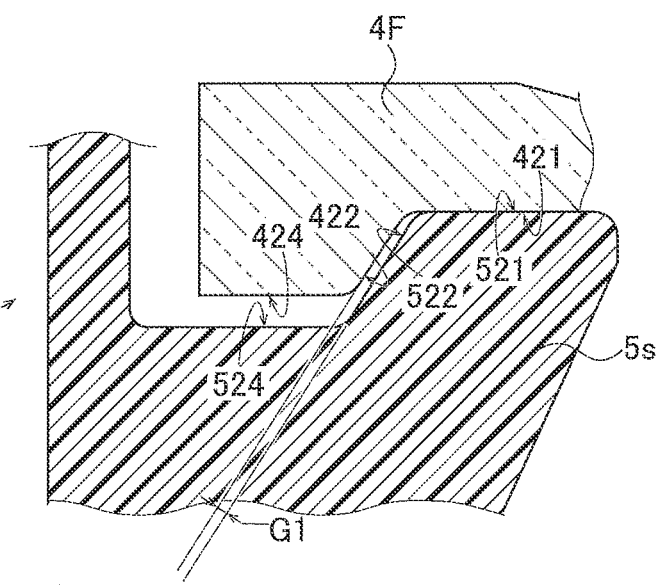

Next, with reference to FIGS. 2 to 4C, an assembling method will be described in housing (fixing) the lens 4, the aperture member 3, and the image sensor 2 in the holder 5. Note that, FIG. 4A illustrates a part of the cross section of the flange part 4F of the lens 4, and FIG. 4B illustrates a part of the cross section of the housing part 5C of the holder 5. FIG. 4C illustrates the state where the flange part 4F of the lens 4 is housed in the housing part 5C.

Firstly, in FIG. 3, the lens 4 is inserted from the object side into the housing part 5C of the holder 5, and placed on the lens supporting part 5S of the holder 5. This allows the first flat surface 421 of the flange part 4F to abut on the first abutting surface 521 of the holder 5. Thus, displacement of the lens 4 on the image plane side is restricted. In this state, as illustrated in FIG. 4C, a slight gap G1 is provided between the lens inclined surface 422 of the flange part 4F and the first holder inclined surface 522 of the holder 5. In a non-limiting example, the gap G1 in the normal direction relative to the lens inclined surface 422 or the first holder inclined surface 522 is within a range of about 5 μm to 15 μm.

An inclination angle θ1 (see FIG. 4A) of the lens inclined surface 422 to the optical axis Ax and an inclination angle θ2 (see FIG. 4B) to the optical axis Ax of the first holder inclined surface 522 preferably both fall within a range of 0 degrees to 30 degrees. In the case where the inclination angle θ1 or θ2 becomes greater than 30 degrees, the lens 4 may be disposed eccentrically from the center of the holder 5 when the lens 4 is inserted into the housing part 5C of the holder 5 from the object side.

Note that, the inclination angle θ1 and the inclination angle θ2 may not be an identical value.

Next, to the housing part 5C of the holder 5 into which the lens 4 has been inserted, the aperture member 3 is press-fitted from the object side. The press-fitting of the aperture member 3 is carried out by pushing the object side main surface 31f of the aperture member 3 until the second abutting surface 323 of the aperture member 3 abuts on the second flat surface 423 of the lens 4. Accordingly, in the state where the press-fitting of the aperture member 3 has been completed, the first flat surface 421 of the flange part 4F abuts on the first abutting surface 521 of the holder 5, and the second flat surface 423 of the flange part 4F abuts on the second abutting surface 323 of the aperture member 3. That is, the lens 4 is sandwiched between the aperture member 3 and the holder 5 to be fixed, via the first flat surface 421 on the image plane side and the second flat surface 423 on the object side.

After the press-fitting, the space between the chamfered surface 31cf of the aperture member 3 and the inner surface 51 of the holder 5 is filled with the adhesive agent 10 to be cured.

Next, using an adhesive agent, the image sensor 2 is attached to the holder 5 such that the image-forming plane 2s of the image sensor 2 is brought into contact with the image plane side end 526 of the holder 5. A step 527 is formed at the outer edge of the image plane side end 526 of the holder 5. Thus, once the image sensor 2 is mounted on the image plane side end 526, the image sensor 2 is highly precisely positioned on a plane orthogonal to the optical axis Ax.

After the lens 4, the aperture member 3, and the image sensor 2 are fixed to the holder 5 as described above, the lens unit 1 illustrated in FIG. 2 has been assembled.

In the state where the lens unit 1 has been assembled, a distance from the first flat surface 421 of the lens 4 to the focal plane of the lens 4 is equal to a distance 5Sh (see FIG. 2) from the first abutting surface 521 of the holder 5 to the image-forming plane 2s of the image sensor 2. In other words, the height in the optical axis direction of the first abutting surface 521 with reference to the image plane side end 526 is determined so that the focal plane of the lens 4 matches with the image-forming plane 2s of the image sensor 2 in the state where the first flat surface 421 of the lens 4 abuts on the first abutting surface 521 of the holder 5. Thus, any lens focus adjusting mechanism is not required for the lens unit 1 according to the present embodiment.

Figure 7:
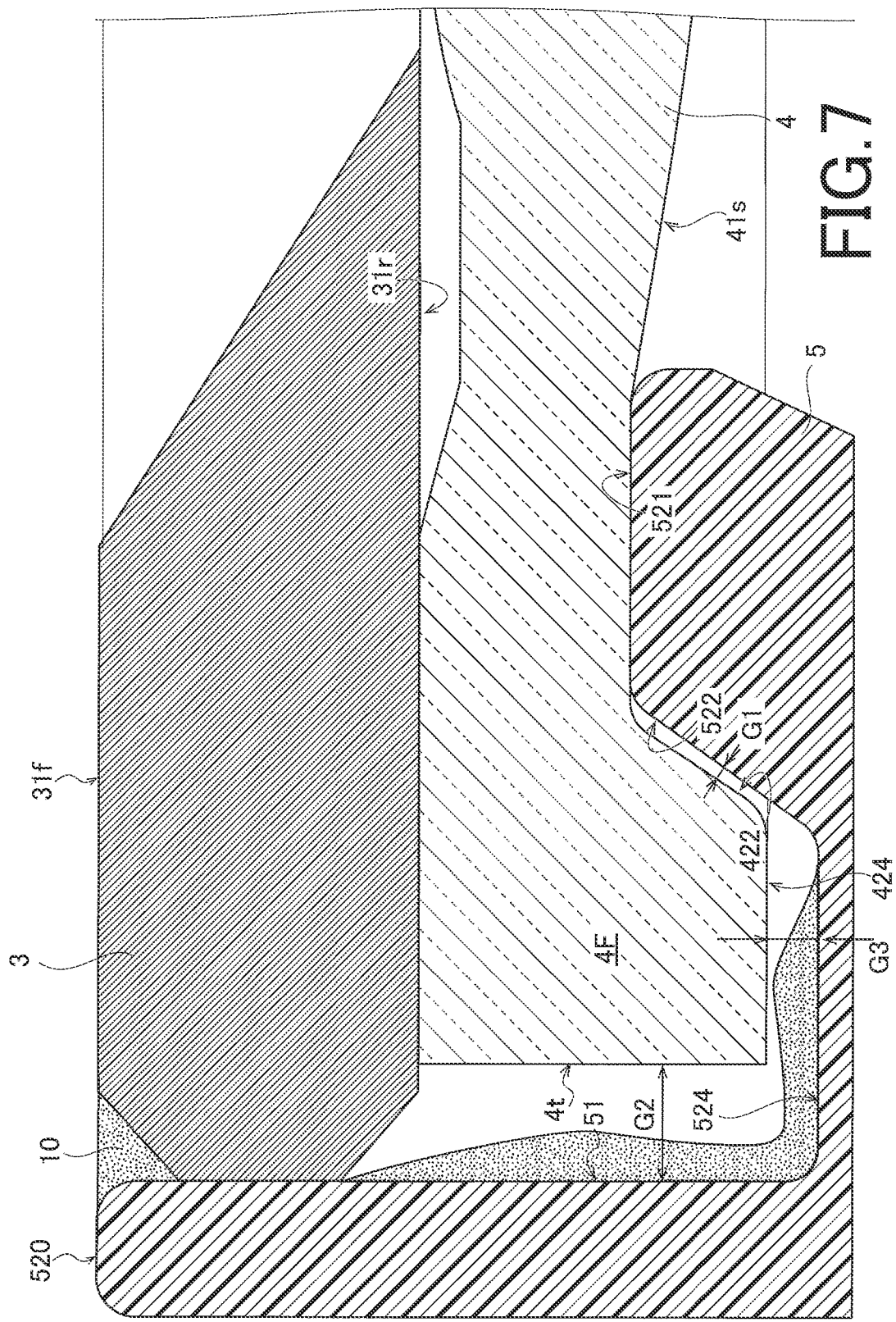
FIG. 7 is an explanatory illustration of the state where an adhesive agent leaks toward the lens side in assembling the lens unit in FIG. 5.

Next, with reference to FIGS. 5 to 7, technical features of the lens unit 1 according to the present embodiment will be described in more details. FIGS. 5 to 7 each illustrates an enlarged cross-section around the flange part 4F of the lens 4. FIG. 5 illustrates an abutting surface range R1 where the first flat surface 421 of the flange part 4F of the lens 4 abuts on the first abutting surface 521 of the holder 5. The abutting surface range R1 is defined by a position P11 and a position P12 in FIG. 5. Here, as illustrated in FIG. 4C, the gap G1 (namely, an example of a first gap) is provided between the lens inclined surface 422 of the lens 4 and the first holder inclined surface 522 of the holder 5 over the entire circumference.

The gap G1 is provided on the following grounds.

Firstly, assuming that there is no gap between the lens inclined surface 422 and the first holder inclined surface 522, the lens inclined surface 422 may partially interfere with the first holder inclined surface 522 during assembly, depending on variations in inclination angle of the inclined surfaces, when the lens 4 is placed on the lens supporting part 5S of the holder 5 during the assembly process. In this case, the first flat surface 421 may deviate from a plane orthogonal to the optical axis direction, and the first flat surface 421 of the flange part 4F of the lens 4 may at least partially fail to abut on the first abutting surface 521. In this state, since the intended positioning of the lens 4 is lost, the lens performance may be adversely affected. Such adverse affection may include any displacement in the focal plane, for example.

Even in the state where the first flat surface 421 at least partially fails to abut on the first abutting surface 521, the first flat surface 421 of the flange part 4F of the lens 4 may possibly abut on the first abutting surface 521 in the abutting surface range R1 by the pressing force in press-fitting the aperture member 3 toward the image plane side. In this case, however, great distortion may occur in the lens 4.

In view of the above, the gap G1 is provided to prevent distortion in the lens 4 while maintaining precise focus of the lens 4.

FIG. 5 illustrates an abutting surface range R2 as the range of the second abutting surface 323 that abuts on the second flat surface 423 of the flange part 4F of the lens 4, in the image plane side main surface 31r of the aperture member 3. The abutting surface range R2 is defined by a position P21 and a position P22 in FIG. 5.

In the lens unit 1 according to the present embodiment, the abutting surface range R2 includes an overlapping range RO that overlaps with the abutting surface range R1 as seen from the optical axis direction. Accordingly, when the aperture member 3 is pressed from its object side main surface 31f toward the image plane side in order to perform press-fitting of the aperture member 3 to the holder 5, force in the optical axis direction is applied to the overlapping range RO. Thus, the lens 4 is sandwiched between the aperture member 3 and the holder 5, with ensured surface contact between the first flat surface 421 and the first abutting surface 521 and between the second flat surface 423 and the second abutting surface 323. Thus, inside the housing part 5C of the holder 5, the lens 4 is disposed at the position where the desired optical performance is achieved. Since the lens 4 is restrained between the aperture member 3 and the holder 5 in the overlapping range RO, the reference position for optical performance is maintained both before and after the reflow soldering process.

Note that, in view of the ensured surface contact during the pressing of the aperture member 3, a ratio of the overlapping range RO to the abutting surface range R1 is preferably 50% or more.

Next, with reference to FIG. 6, it will be described changes in shape of each part around the flange part 4F of the lens 4 under the room temperature state and the thermal expansion state in the reflow soldering process.

The lens unit 1 according to the embodiment is configured to avoid application of great stress to the lens 4 under a high-temperature environment in the reflow soldering process. This is explained as follows. When the lens 4 is deformed by application of great stress under a high temperature environment, the lens 4 will not recover its original shape it had before the reflow soldering process, after the reflow soldering process, and the intended optical performance will not be achieved.

If the coefficient of linear expansion of the holder 5 is greater than that of the lens 4, the thermal expansion of the holder 5 under a high temperature environment pushes up the lens 4 toward the object side, thereby applying a great load on the lens 4. Therefore, the coefficient of linear expansion of the holder 5 is preferably smaller than the coefficient of linear expansion of the lens 4 (that is, the relationship: the coefficient of linear expansion of the lens 4>the coefficient of linear expansion of the holder 5). Here, the coefficient of linear expansion of the transparent resin material used as the material of the lens 4 is as high as 60 to $100 \times 10^{-6}$/K (60 ppm to 100 ppm), for example. Thus, use of the holder 5 of a resin material of lower coefficient of linear expansion satisfies the relationship recited above.

In FIG. 6, the outer shape of the lens 4 in the room temperature state is represented by a broken line (corresponding to the solid line of the lens 4 in FIG. 5) and the outer shape of the lens 4 in the thermal expansion state is represented by a solid line.

In the lens unit 1 according to the present embodiment, while each side of the aperture member 3 and the diameter of the lens 4 measure several millimeters, the thickness is 1 mm or less. Accordingly, the shape deformation amount in the thermal expansion state (the expansion amount) is dominant in the lateral direction (that is, the direction orthogonal to the optical axis Ax) than the thickness direction (that is, the optical axis direction).

As illustrated in FIG. 5, in the state before thermal expansion, a gap G2 (namely, an example of a second gap) is provided between the sidewall surface 4t of the flange part 4F of the lens 4 and the inner surface 51 of the holder 5 over the entire circumference. The gap G2 is set to avoid distortion due to interference between the sidewall surface 4t of the lens 4 and the inner surface 51 of the holder 5 when the lens 4 thermally expands. While it depends on the amount of the resin material of the lens 4 and the holder 5, the dimension in the lateral direction of the gap G2 for avoiding the interference preferably falls within a range of, for example, 5% to 10% of the outer diameter of the lens 4 as seen from the optical axis direction. When the gap G2 is 5% or more of the outer diameter of the lens 4, interference does not occur between the lens 4 and the holder 5. When the gap G2 is 10% or less of the outer diameter of the lens 4, it preferable makes the lens unit small-sized as a whole.

Note that, when the thermal expansion amount of the lens 4 is greater than that of the holder 5, as illustrated in FIG. 6, the gap G1 (that is, the gap between the lens inclined surface 422 and the first holder inclined surface 522; see FIG. 5) becomes further greater under a high temperature environment than in room temperature. Accordingly, no stress occurs at the lens inclined surface 422 of the lens 4 under a high temperature environment.

As illustrated in FIG. 5, in the lens unit 1 according to the present embodiment, the overlapping range RO in which the lens 4 is sandwiched between the aperture member 3 and the holder 5 is provided on the side nearer to the optical axis Ax in the flange part 4F of the lens 4 (that is, the inner side). This is advantageous in minimizing the risk of the aperture member 3 coming off from the holder 5 under a high temperature environment. The reason is as follows.

In the lens unit 1 according to the present embodiment, in the overlapping range RO in the FIG. 5, while the lens 4 is restrained as being sandwiched between the aperture member 3 and the holder 5, the other portions (that is, portions which are not restrained) are in a free state. Furthermore, while the aperture member 3 is press-fitted to the holder 5 over its circumference thereby restrained, the other portions (that is, the portions which are not press-fitted) are in a free state. Here, in the lens unit 1, as illustrated in FIG. 5, the position corresponding to the overlapping range RO (the restrained position) and the press-fit position between the aperture member 3 and the holder 5 (the restrained position) are relatively far from each other, with regard to the first flat surface 421 and the second flat surface 423 of the lens 4. Thus, deformation due to thermal expansion of the lens 4 and the aperture member 3 occurs in a region defined between the two restrained points which are relatively far from each other and thus, the deformation is absorbed between them. Consequently, great load will not be applied on the press-fit position between the aperture member 3 and the holder 5.

Even in the case where the coefficient of linear expansion of the holder 5 is set to be lower than that of the lens 4, the difference in coefficient of linear expansion between the holder 5 and the lens 4 is preferably 80 ppm or less. If the difference in coefficient of linear expansion between the holder 5 and the lens 4 is greater than 80 ppm, distortion tends to occur at the lens 4.

On the other hand, as described above, deformation due to thermal expansion of the lens 4 and the aperture member 3 occurs in a region defined between the two restrained positions where the lens 4 and the aperture member 3 are in a free state. Accordingly, the difference in thermal expansion amount between the holder 5 and the aperture member 3 under a high temperature environment is preferably small. With the reduced difference in thermal expansion amount between the holder 5 and the aperture member 3, the holder 5 and the aperture member 3 slowly deform under a high temperature environment, which facilitates recovery to the original positions under the subsequent room temperature environment. For example, the difference in coefficient of linear expansion between the holder 5 and the aperture member 3 is preferably 10 ppm or less.

As illustrated in FIG. 5, in the lens unit 1 according to the present embodiment, the second flat surface 423 of the flange part 4F of the lens 4 abuts on the second abutting surface 323 which is a part of the image plane side main surface 31r of the aperture member 3. That is, absence of an inclined surface on the object side of the flange part 4F enables the lens unit 1 to be lower (that is, shorter in the optical axis direction). Thus, the lens unit 1 can be further small-sized.

As illustrated in FIG. 7, in the lens unit 1 according to the present embodiment, it is preferably provided a gap G3 (one example of a third gap) in the optical axis direction between the holder 5 and the lens 4, on the outer side of the first holder inclined surface 522. More specifically, the gap G3 is preferably provided between the image plane side end surface 424 of the flange part 4F of the lens 4 and the flange part housing bottom surface 524 of the holder 5.

The provision of the gap G3 is preferable for the following reason.

As described above, the aperture member 3 is press-fitted to the inner surface 51 of the holder 5. The chamfered surface 31cf of the aperture member 3 (see FIG. 3) and the inner surface 51 of the holder 5 are fixed with the adhesive agent 10. Here, since the aperture member 3 is press-fitted to the holder 5 on the image plane side than the adhesive agent 10, the adhesive agent 10 will not normally enter the lens 4 side. Besides, the gap G3 is provided in order to avoid any influence on the optical function of the curved surface part 4R of the lens 4, even if the adhesive agent 10 enters on the lens 4 side.

FIG. 7 illustrates the case where the adhesive agent 10 enters the lens 4 side. Even in that case, the gap G3 receives the adhesive agent 10 to prevent the adhesive agent 10 from reaching the curved surface 41s of the curved surface part 4R. Provided that the gap G3 is absent, there is possibility that the adhesive agent 10 entering the lens 4 side possibly reaches the curved surface part 4R through a gap between the lens 4 and the holder 5 by the capillary action. The gap G3 is preferably provided in order to eliminate the possibility described above.

The lens unit 1 according to the present embodiment has been described above in detail. The main features of the lens unit 1 are summarized as follows.

(1) In the lens unit 1 according to the present embodiment, in the state where the first flat surface 421 of the lens 4 abuts on the first abutting surface 521 of the holder 5, the height in the optical axis direction of the first abutting surface 521 with reference to the image plane side end 526 is determined so that the focal plane of the lens 4 matches with the image-forming plane 2s of the image sensor 2. Thus, any lens focus adjusting mechanisms are not necessary, and the lens unit 1 can be small-sized.

(2) in the lens unit 1 according to the present embodiment, as illustrated in FIG. 5, the abutting surface range R2 includes the overlapping range RO that overlaps with the abutting surface range R1 as seen from the optical axis direction. The gap G1 is formed between the lens inclined surface 422 of the flange part 4F and the first holder inclined surface 522 of the holder 5. Accordingly, when the aperture member 3 is press-fitted to the holder 5, force in the optical axis direction is applied to the overlapping range RO. Thereby, the lens 4 is sandwiched between the aperture member 3 and the holder 5 with ensured surface contact between the first flat surface 421 and the first abutting surface 521 and with ensured surface contact between the second flat surface 423 and the second abutting surface 323. Thus, when the manufacturing of the lens unit 1 is completed, the focal plane of the lens 4 precisely matches with the image-forming plane 2s of the image sensor 2. Consequently, desired optical performance is obtained.

Furthermore, in the lens unit 1 according to the present embodiment, due to the lens 4 being sandwiched between the aperture member 3 and the holder 5 in the overlapping range RO, the focal plane is less likely to deviate irrespective of temperature environment variations.

(3) When the lens unit 1 according to the present embodiment is fixed onto a circuit board of an electronic device through a reflow soldering process, the lens unit 1 is exposed to a high temperature environment. Under a high temperature environment, each part of the lens unit 1 thermally expands. Here, due to the gap G2 formed between the sidewall surface 4t of the flange part 4F of the lens 4 and the inner surface 51 of the holder 5 in the lateral direction where the expansion amount is dominant, the sidewall surface 4t of the lens 4 will not interfere with the inner surface 51 of the holder 5.

The lens 4 is restrained by the aperture member 3 and the holder 5 in the overlapping range RO (see FIG. 5). Accordingly, under a high temperature environment, the lens 4 expands particularly in the lateral direction, and the housing part 5C of the holder 5 therefore deforms in a warping manner toward the outer side from the overlapping range RO as a fulcrum. Here, the lens 4 is in a free state, and the aperture member 3 is merely restrained at the press-fit position with the holder 5. Thus, the lens 4 and the aperture member 3, which is an elastic body, are relatively freely movable. Thus, the stress applied to each parts under the high temperature environment is not high. Consequently, when the environment recovers the room temperature from the high temperature, each part of the lens unit 1 returns to the original position as assembled, without inviting any distortion.

Next, with reference to FIGS. 8 and 9, a lens unit according to a second embodiment will be described.

Figure 8:
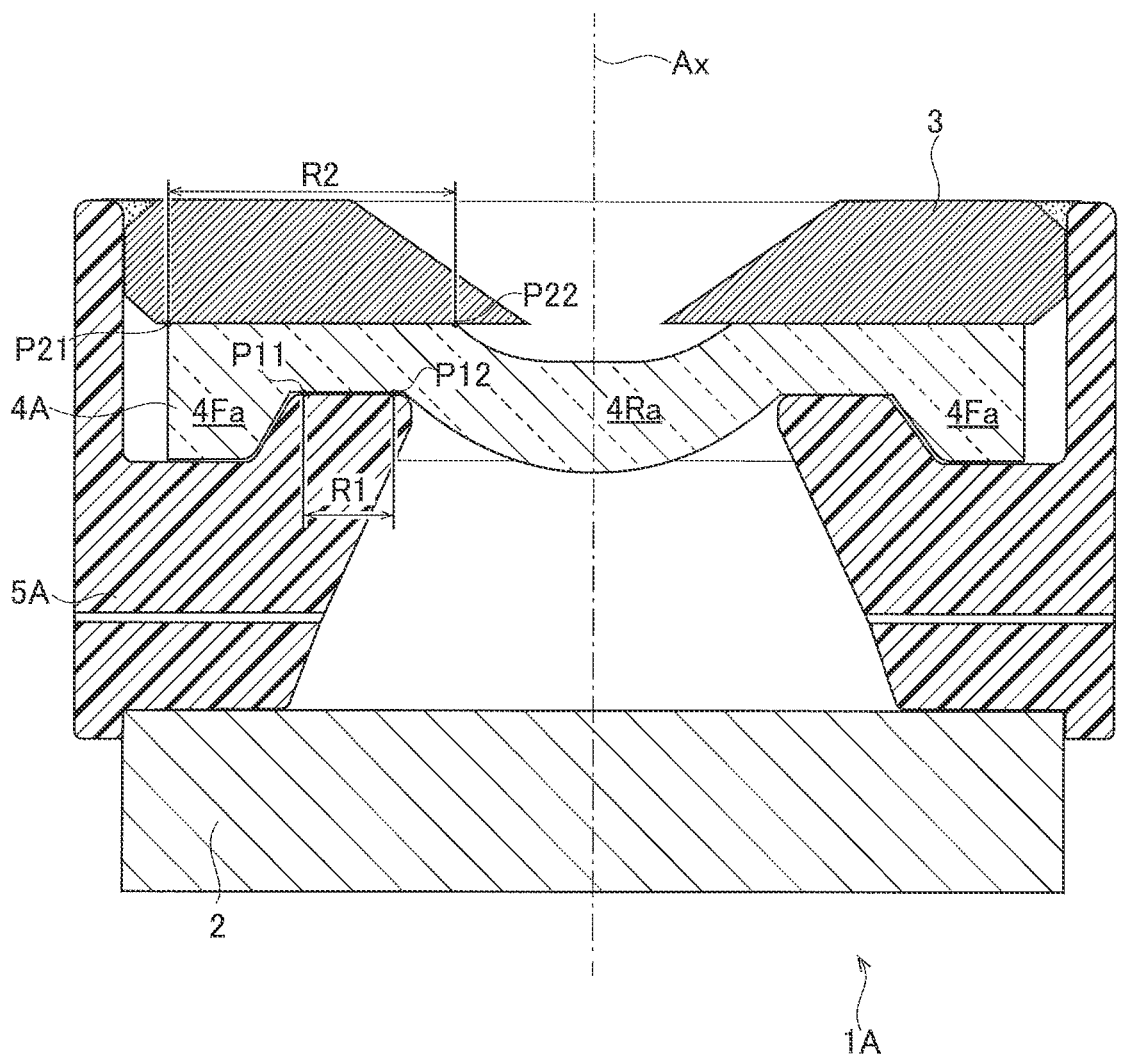
FIG. 8 is a cross-sectional view of a lens unit according to a second embodiment.

FIG. 8 is a cross-sectional view of a lens unit 1A according to the second embodiment. Similarly to FIG. 2. FIG. 8 is a cross-sectional view of the lens unit 1A taken along a plane including the optical axis Ax. Note that, the identical components to those in the lens unit 1 are denoted by identical reference signs for the sake of brevity.

A lens 4A of the lens unit 1A according to the present embodiment is different from the lens 4 according to the first embodiment in that the curved surface part 4Ra has a recessed surface relative to the object side.

A method of assembling the lens 4A and the image sensor 2 on a holder 5A in the lens unit 1A according to the present embodiment is identical to that in the lens unit 1 according to the first embodiment. That is, the lens 4A is sandwiched between the aperture member 3 and the holder 5A along the optical axis Ax.

FIG. 8 illustrates an abutting surface range R1 and an abutting surface range R2. In the abutting surface range R1, the image plane side flat surface of a flange part 4Fa of the lens 4A abuts on the abutting surface of the holder 5A. The abutting surface range R1 is defined by a position P11 and a position P12. In the abutting surface range R2, the object side flat surface of the flange part 4Fa of the lens 4A abuts on the abutting surface of the aperture member 3. The abutting surface range R2 is defined by a position P21 and a position P22. In the lens unit 1A, the abutting surface range R2 completely overlaps with the abutting surface range R1. Thus, the lens 4A is sandwiched between the aperture member 3 and the holder 5A, with ensured surface contact between the flat surfaces and the abutting surfaces in press-fitting the aperture member 3. Thus, the lens 4A is disposed, inside the housing part of the holder 5A, at the position where desired optical performance is obtained.

Next, with reference to FIG. 9, a lens unit 1B according to a variation of the second embodiment will be described.

Figure 9:
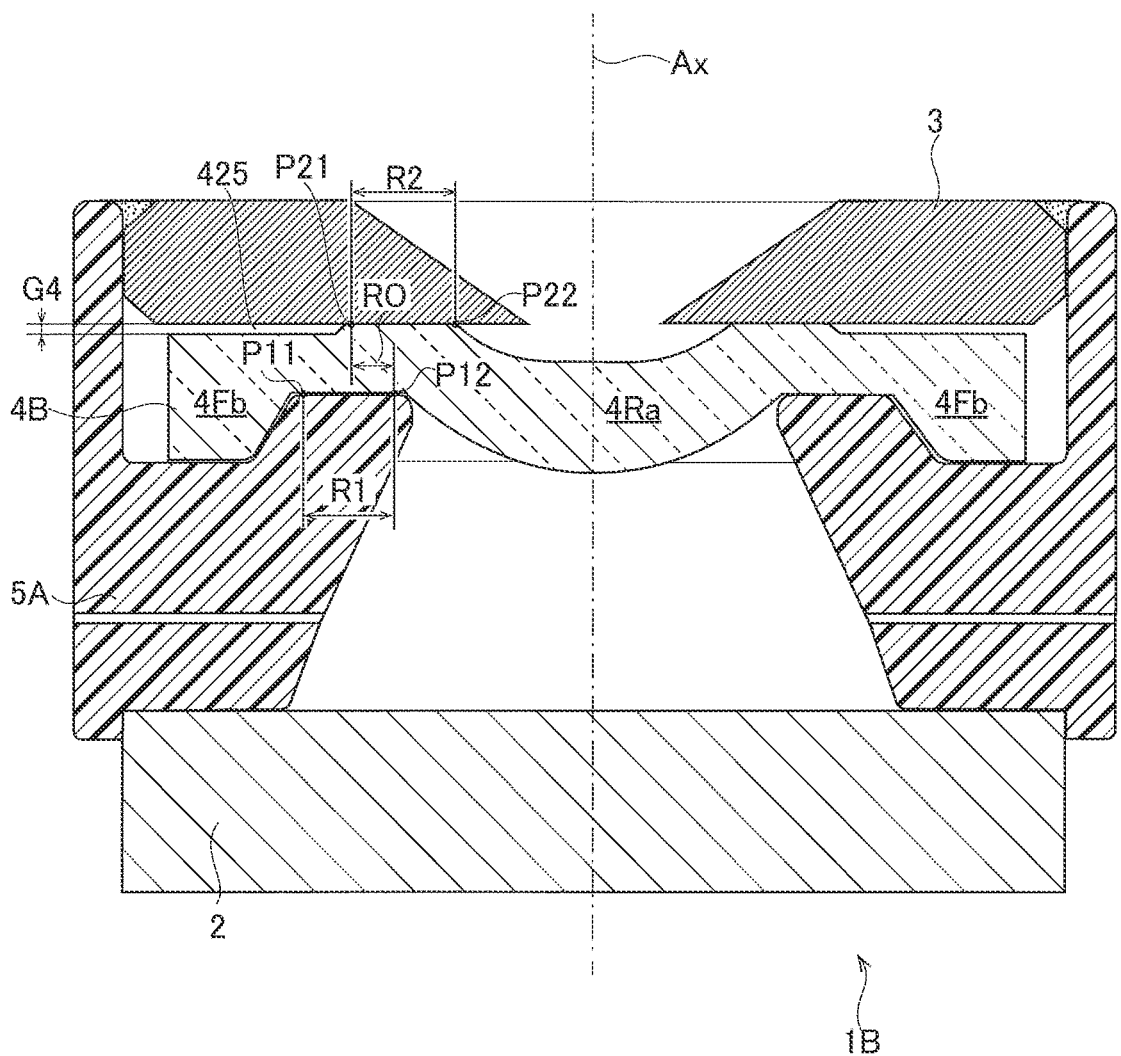
FIG. 9 is a cross-sectional view of a lens unit according to a variation of the second embodiment.

FIG. 9 is a cross-sectional view of the lens unit 1B according to a variation of the second embodiment. Similarly to FIG. 2, FIG. 9 is a cross-sectional view of the lens unit 1B taken along a plane including the optical axis Ax.

The lens unit 1B according to the variation is different from the lens unit 1A (see FIG. 8) in terms of the lens shape. As compared to the flange part 4Fa, a flange part 4Fb of a lens 4B of the lens unit 1B is provided with a recess 425 on the outer side at the surface on the object side, thereby forming a gap G4 (one example of a fourth gap) between the flange part 4Fb and the aperture member 3. The provision of the gap G4 improves flexibility of the lens 4 in shifting toward the object side. This reduces stress that may occur at the lens 4B under a high temperature environment.

In the lens unit 1B, the provision of the gap G4 narrows the abutting surface range R2 than the lens unit 1A illustrated in FIG. 8. Here, as described above, the overlapping range RO is preferably 50% or more of the abutting surface range R1.

In an example in FIG. 9, the gap G4 is provided by forming the recess 425 at the flange part 4Fb of the lens 4B. Nevertheless, the present invention is not limited that example. Instead of employing a flat object side surface of the flange part 4Fb, the gap G4 may be provided by forming a recess at the image plane side main surface of the aperture member 3. Alternatively, the gap G4 may be provided by forming a recess at both of the surface on the object side of the flange part 4Fb and the image plane side main surface of the aperture member 3.

While FIG. 9 illustrates the example of providing the gap G4 by forming a step on the object side surface of the flange part 4Fb, the present invention is not limited thereto. That is, a recess formed at the flange part 4Fb may be of any shape so long as the gap G4 is provided. For example, the recess may have a tapered shape or a curved shape. The same holds true to the case where a recess is formed at the image plane side main surface of the aperture member 3.

The embodiments of the lens unit according to the present invention have been described above. The present invention is not limited to the above embodiments. Various improvements or changes may be made to the embodiments within a range not deviating from the gist of the present invention.

For example, the technical features referred to in the variation of the second embodiment (that is, the provision of the recess at the object side surface of the flange part of the lens and/or the image plane side main surface of the aperture member) may be applied to the lens unit 1 according to the first embodiment.

While the lens unit 1 according to the embodiment has a cuboid shape, the present invention is applicable to the lens unit having any outer shape. For example, the outer shape of the lens unit may be a substantial cylindrical shape.

What is claimed is:

1. A lens unit comprising:
an image sensor;
a lens formed of curable resin;
an aperture member formed of an elastic body; and
a holder having a hollow structure, wherein
in the holder, the aperture member and the lens are disposed in sequence from a first end on one side along an optical axis, and the image sensor is disposed at a second end on other side along the optical axis,
the lens includes a curved surface part formed at its center and a flange part formed on an outer side of the curved surface part,
the flange part includes:
a first flat surface orthogonal to the optical axis and formed on the image sensor side;
a second flat surface orthogonal to the optical axis and formed on the aperture member side; and
a lens inclined surface formed on an outer side than the first flat surface and inclined from the first flat surface toward the image sensor,
the holder includes a first abutting surface abutting on the first flat surface of the lens and a holder inclined surface formed on an outer side than the first abutting surface and inclined from the first abutting surface toward the image sensor,
the aperture member includes a second abutting surface abutting on the second flat surface of the lens,
a range of the second abutting surface includes an overlapping range that overlaps with a range of the first abutting surface as seen from an optical axis direction,
a distance from the first flat surface of the lens to a focal plane of the lens and a distance from the first abutting surface of the holder to an image-forming plane of the image sensor are equal to each other,
a first gap is provided between the holder inclined surface and the lens inclined surface over an entire circumference, and
a second gap is provided between an outer circumferential surface of the lens and an inner surface of the holder over an entire circumference.

2. The lens unit according to claim 1, wherein, in a cross section including the optical axis, an inclination angle of the lens inclined surface and the holder inclined surface relative to the optical axis falls within a range of 0 degrees to 30 degrees.

3. The lens unit according to claim 2, wherein, as seen from the optical axis direction, the second gap falls within a range of 5% to 10% of an outer diameter of the lens.

4. The lens unit according to claim 2, wherein a coefficient of linear expansion of the lens is greater than a coefficient of linear expansion of the holder.

5. The lens unit according to claim 2, wherein
the aperture member is fixed to the inner surface of the holder with an adhesive agent provided at a circumferential edge on an outer side of the aperture member, and
a third gap is provided in the optical axis direction between the holder and the lens on an outer side of the holder inclined surface.

6. The lens unit according to claim 2, wherein, a fourth gap is provided in the optical axis direction between the flange part and the aperture member on an outer side than the overlapping range.

7. The lens unit according to claim 2, wherein a step for positioning the image sensor is formed at the second end of the holder.

8. The lens unit according to claim 2, wherein the curved surface part of the lens has an aspheric surface.

9. The lens unit according to claim 2, wherein the holder is provided with a through hole for evacuating gas in space between the lens and the image sensor.

10. The lens unit according to claim 1, wherein, as seen from the optical axis direction, the second gap falls within a range of 5% to 10% of an outer diameter of the lens.

11. The lens unit according to claim 10, wherein a coefficient of linear expansion of the lens is greater than a coefficient of linear expansion of the holder.

12. The lens unit according to claim 10, wherein
the aperture member is fixed to the inner surface of the holder with an adhesive agent provided at a circumferential edge on an outer side of the aperture member, and a third gap is provided in the optical axis direction between the holder and the lens on an outer side of the holder inclined surface.

13. The lens unit according to claim 1, wherein a coefficient of linear expansion of the lens is greater than a coefficient of linear expansion of the holder.

14. The lens unit according to claim 13, wherein a difference in coefficient of linear expansion between the holder and the aperture member is 10 ppm or less, and a difference in coefficient of linear expansion between the holder and the lens is 80 ppm or less.

15. The lens unit according to claim 1, wherein
the aperture member is fixed to the inner surface of the holder with an adhesive agent provided at a circumferential edge on an outer side of the aperture member, and
a third gap is provided in the optical axis direction between the holder and the lens on an outer side of the holder inclined surface.

16. The lens unit according to claim 1, wherein, a fourth gap is provided in the optical axis direction between the flange part and the aperture member on an outer side than the overlapping range.

17. The lens unit according to claim 1, wherein a step for positioning the image sensor is formed at the second end of the holder.

18. The lens unit according to claim 17, wherein the holder is provided with a through hole for evacuating gas in space between the lens and the image sensor.

19. The lens unit according to claim 1, wherein the curved surface part of the lens has an aspheric surface.

20. The lens unit according to claim 1, wherein the holder is provided with a through hole for evacuating gas in space between the lens and the image sensor.

* * * * *